United States Patent
Fettweis et al.

(10) Patent No.: US 8,774,161 B2
(45) Date of Patent: Jul. 8, 2014

(54) COORDINATED INTEGRATION OF SECONDARY WIRELESS COMMUNICATION TERMINALS INTO A PRIMARY WIRELESS COMMUNICATION NETWORK

(75) Inventors: Gerhard Fettweis, Dresden (DE); Peter Rost, Dresden (DE); Walter Nitzold, Dresden (DE)

(73) Assignee: Vodafone Holding GmbH, Düsseldorf (DE)

( * ) Notice: Subject to any disclaimer, the term of this patent is extended or adjusted under 35 U.S.C. 154(b) by 165 days.

(21) Appl. No.: 13/175,781

(22) Filed: Jul. 1, 2011

(65) Prior Publication Data
US 2012/0002644 A1    Jan. 5, 2012

(30) Foreign Application Priority Data
Jul. 2, 2010    (EP) .................................... 10168318

(51) Int. Cl.
*H04B 7/212* (2006.01)

(52) U.S. Cl.
USPC ........................................................ 370/348

(58) Field of Classification Search
None
See application file for complete search history.

(56) References Cited

U.S. PATENT DOCUMENTS

| | | | |
|---|---|---|---|
| 2005/0286462 A1* | 12/2005 | Roh et al. | 370/328 |
| 2008/0159239 A1 | 7/2008 | Odlyzko et al. | |
| 2009/0232085 A1 | 9/2009 | Boyer et al. | |
| 2010/0290352 A1* | 11/2010 | Oyman et al. | 370/252 |

FOREIGN PATENT DOCUMENTS

| | | | |
|---|---|---|---|
| WO | 9730526 A1 | 8/1997 | |
| WO | 2008058083 A2 | 5/2008 | |
| WO | 2010025279 A1 | 3/2010 | |

OTHER PUBLICATIONS

"3rd Generation Partnership Project; Technical Specification Group Services and System Aspects; Service Requirements for Machine-Type Communications (MTC); Stage 1 (Release 10)", 3GPP TS 22.368, V10.1.0 (Jun. 2010).

"3rd Generation Partnership Project; Technical Specification Group Services and System Aspects; Study on Facilitating Machine to Machine Communication in 3GPP Systems; (Release 8)", 3GPP TR 22.868, V8.0.0 (Mar. 2007).

* cited by examiner

*Primary Examiner* — Minh-Trang Nguyen
(74) *Attorney, Agent, or Firm* — Edwards Wildman Palmer LLP; Peter F. Corless; Carolina E. Save

(57) ABSTRACT

A communication method for a mobile communication system is described. Available radio resources, i.e. an available frequency band, are divided into a plurality of comparatively small radio resource units. The mobile communication system uses a first communication protocol for communicating with mobile stations compatible with the mobile communication system. For communicating with an autonomous terminal at least one radio resource unit is allocated, in which a second communication protocol incompatible with the first communication protocol is used for communicating with the terminal.

13 Claims, 4 Drawing Sheets

COORDINATED INTEGRATION OF SECONDARY WIRELESS COMMUNICATION TERMINALS INTO A PRIMARY WIRELESS COMMUNICATION NETWORK

CROSS-REFERENCE TO RELATED APPLICATIONS

This application claims priority under 35 U.S.C. §119(a) to European Patent Application No. 10168318.3, filed Jul. 2, 2010, the entire contents of which application are incorporated herein by reference.

The invention relates to the integration of secondary wireless communication terminals into a first radio communication network, particularly to a method for radio resource management allowing communication of mobile stations with a corresponding wireless communication network using a first communication protocol and at the same time with autonomous communication terminals using the radio resources of the first wireless communication system and using a second, i.e. different, communication protocol.

Today's mobile communication systems accommodate an increasing number of mobile terminals. Most of these terminals are cell phones or PDAs or the like, which communicate within a network when a user operates his cell phone, i.e. the user makes a telephone call or uses his device otherwise for example for exchanging arbitrary data. These devices typically are called mobile stations or mobile terminals or user equipment (UE). Since all of these stations typically share the property of being mobile, they are collectively called mobile stations in the following.

In contrast to that communication stations being somewhere in the middle of a communication chain, i.e. stations receiving information and forwarding said information to another communication station or terminal are collectively called base stations in the following. Typically base stations are not mobile but locally fixed, for example such as a base station in GSM terms or node B in UMTS.

Future mobile communication systems will be used not only for the transmission of data between an interactively used mobile station, i.e. such as a phone or any other device linked to the communication system, but will also serve more and more for exchanging data between machines, i.e. for so-called machine-to-machine communication. There are numerous application areas in which a first machine, which may be an endpoint in a communication chain and thus has the property of a terminal, transmits data to a second machine, which also may be a terminal, using a mobile communication system, i.e. a radio communication system. The machines are not necessarily mobile but essentially may be located at a fixed location and typically do not provide a user interface for interactively transmitting data. However, these terminals basically may be mobile.

In a particular example a gauging station needs to communicate its sensed information to a central processing station. In an exemplary embodiment the gauging station is a weather station sensing the temperature for example and other climate data. The data volume reflecting the sensed data typically is very small when compared for example to data exchanged in a telephone call. Also, timing issues are nearly negligible, since usually the transmission of the sensed weather data is not as time-critical as in a telephone call. Although the gauging station may be fixed at a particular location an easy way for transmitting information to and receiving information from said station comprises using a mobile communication system, i.e. a radio transmission system for transmitting data to and from the station. Using a radio transmission system provides many advantages, for example saving the efforts of providing a wired data connection to the station.

However, using a mobile communication system requires that the device is capable of communicating with a base station of the involved mobile communication system. That is, the device conventionally must incorporate the hard- and software necessary for using a communication protocol provided by the mobile communication system. Taking into account that transmission protocols of modern wireless communication systems are very complex and require sophisticated and hence expensive hard- and software, the problem arises that the device must be equipped with the necessary hard- and software to communicate using the mobile communication system.

Taking into account that a gauging station does not require the quality of service as supplied by the mobile communication system, but must be furnished with the sophisticated hard- and software for transmitting its data to a further processing machine, the furnishing of each gauging station is an oversized and very costly solution.

Network providers operating a complex mobile communication system may want to use their system for communicating with these comparatively simple machine devices, wherein these may have the above mentioned properties and do not require all features of a highly sophisticated mobile communication system. Network providers accordingly prefer a solution for using their established mobile communication network while at the same time avoiding the cost of soft- and hardware necessary for communicating with the devices using the highly complex transmission protocol as used for the transmission of data in telephone calls. As a basic condition, i.e. since radio transmission frequency ranges are not arbitrarily available but strictly assigned to network providers, a preferred solution requires the usage of the frequency bands assigned to the implementing network provider.

There is a plurality of radio transmission systems which basically may be used for coupling such a device. In one example a radio transmission system implementing the WIMAX protocol may be considered. However, there are a couple of disadvantages when using one of these systems. For example when using a system implementing the WIMAX protocol, or one protocol of the family of WIMAX protocols, the device must hold the appropriate soft- and hardware necessary for participating in the WIMAX network. Apparently, for sending small amounts of data from a comparatively simple machine device, it is also oversized to provide the soft- and hardware required for using these protocols.

Hence there is a demand for integrating the communication with a comparatively simple terminal appropriately into the communication of a mobile communication network while avoiding the costs of furnishing each simple terminal with sophisticated and costly hard- and software.

DETAILED DESCRIPTION

Figure 1:
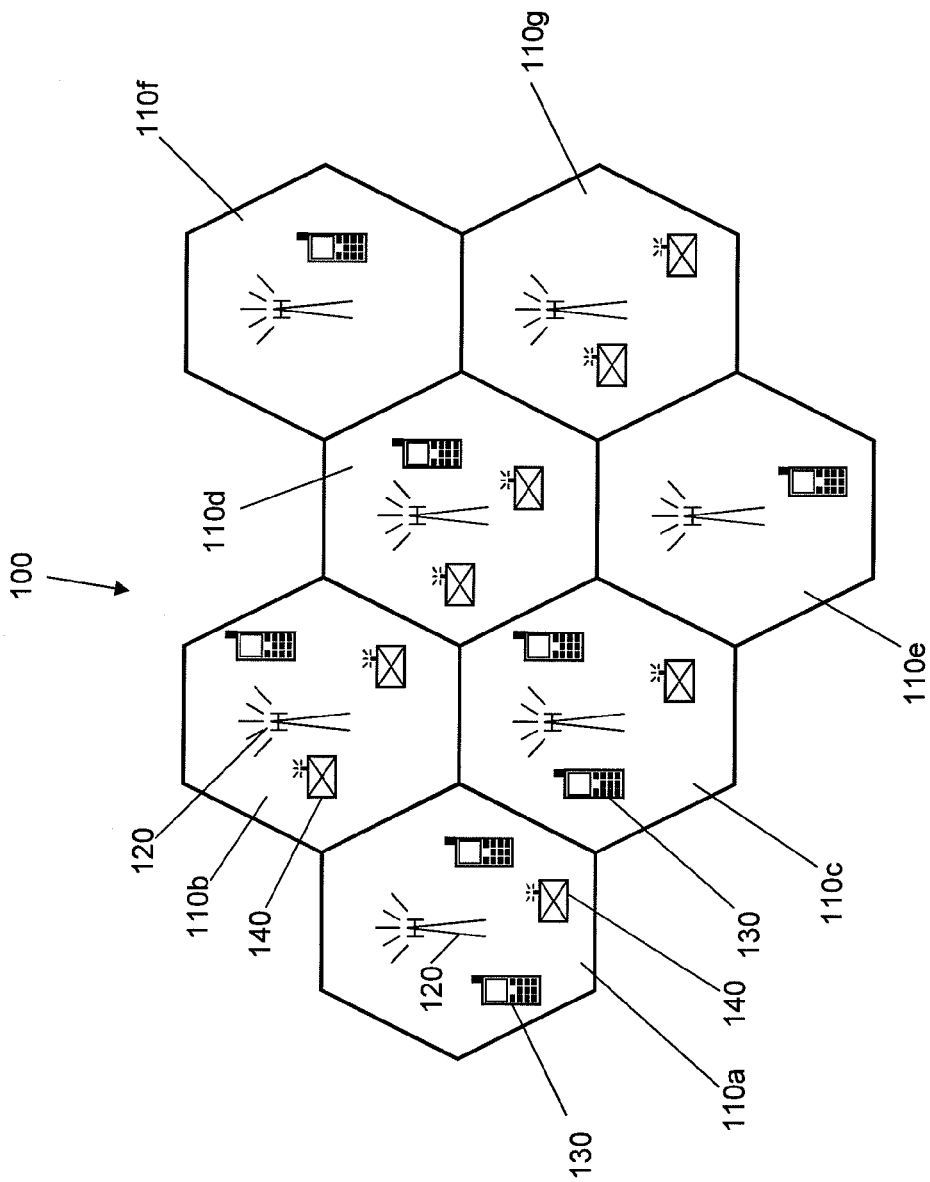
FIG. 1 depicts a schematic illustrating a mobile communication system.

FIG. 1 depicts a mobile communication system 100 comprising a plurality of communication cells 110, denoted as 110a to 110e, wherein the area of each cell is defined by the area covered by the at least one base station 120 comprised in the cell. Mobile stations 130 are communicatively connected by a radio link to the base station of a cell. A mobile station 130 can be a cell phone or PDA or a laptop computer, which is are adapted and configured to exchange data using the mobile communication system. Typically mobile stations 130 are interactive and operated by a person and data is transmitted and received when initiated by the operating user or, for example upon an incoming telephone call, when initiated by another person operating another mobile station 130.

Furthermore communication devices 140 may use mobile communication system 100. Typically these devices are not interactive, i.e. there is no person operating these terminals and in this way initiating any data exchange. Instead devices 140 typically are devices for so-called machine-to-machine communication, i.e. communication between two devices and wherein a data transmission is not initiated by a user interaction, but by the autonomously operating device itself or as requested by another machine. Furthermore these devices typically are endpoints in a communication chain, i.e. a device does not receive data from a first station and forwards that data to a third station as a relay station. In the following these devices are called autonomous terminals 140.

In one embodiment an autonomous terminal 140 may be a gauging station comprising a sensor, which for example may sense any data of its surroundings, such as climate or weather data or any other arbitrary information. A gauging station may collect information over a predefined time period or may collect data at one moment in time. In one example the gauging station may produce the data upon request, i.e. when a request message is received and just before the requested information is transmitted to a central server station, which processes the transmitted data. Typically these autonomously operating terminals 140 serve as a data source generating data reflecting arbitrary information, which the device generates for example by measurements.

A plurality of mobile communication system architectures enabling a radio link between a base station 120 and at least one mobile station 130 for transmitting data to the device and receiving data from the device is known, for example the GSM system or future systems like LTE. Each of these systems implements an access method, which forms part of a communication protocol, and which typically must be used by every communication device wishing to use the system providing said access method. The implemented communication protocols typically are designed to provide the necessary quality of service for an online communication, which in one example may be a telephone call. Since a data delay in the transmission to and from an interactive mobile station 130 has a high impact on the quality of the phone connection, the communication system is capable of providing timely data transmission of the data when required. That is, the mobile communication system is capable of transmitting and delivering data very fast to enable a high quality of a speech connection. In addition known systems may be also designed for transmitting amounts of data to a mobile station 130 larger than necessary for a plain speech connection, for example in cases of a video phone call requiring the transmission of picture data. As a consequence of the requirements for high quality connections and high availability requirements, the implemented communication protocols are fast and complex. Mobile stations 130 correspondingly are equipped with expensive and sophisticated soft- and hardware implementing at least one protocol for accessing the mobile communication system.

In contrast to the requirements of a mobile station 130, the requirements of an autonomous terminal 140 typically are different. The transmission of data to and from an autonomous terminal 140 typically is less sensitive regarding the timing. That is, a delay of data in the order of a second in most cases is tolerable. Also, the transmission of data in many applications can be scheduled to a predetermined time schedule, thus allowing lower availability of the communication network. Furthermore, the amount of data to be transmitted from an autonomous terminal 140 to a server in many cases is small.

Accordingly an autonomous device 140 has lower quality of service requirements than mobile station 130. Accordingly, the autonomous terminals can be either equipped with all soft- and hardware for use in a sophisticated mobile communication system as described above, which comes at the cost of furnishing each autonomous terminal with the sophisticated soft- and hardware. Alternatively, autonomous terminals can be equipped with less costly and less sophisticated soft- and hardware, which comes at the cost that the devices cannot be operated in the sophisticated mobile communication system. Also, since autonomous terminals shall not interfere with existing communication systems, the devices must not be operated at any frequency reserved for a mobile communication system while at the same time said frequency is used by an interactive mobile station 130.

However, in case a provider operating a mobile communication system aims at operating autonomously operating terminals 140 in the frequency ranges licensed, there is a demand for operating the devices at the licensed frequency range.

In order to enable the communication with an autonomous terminal 140 in a frequency range intended for use in a mobile communication system, the physical resources intended for the mobile communication system are at least partially in frequency and temporarily reallocated and used for communicating with at least one autonomous terminal 140, wherein the communication protocol used for communicating with that terminal 140 deviates significantly from that used for communication with mobile stations 130.

Figure 2:
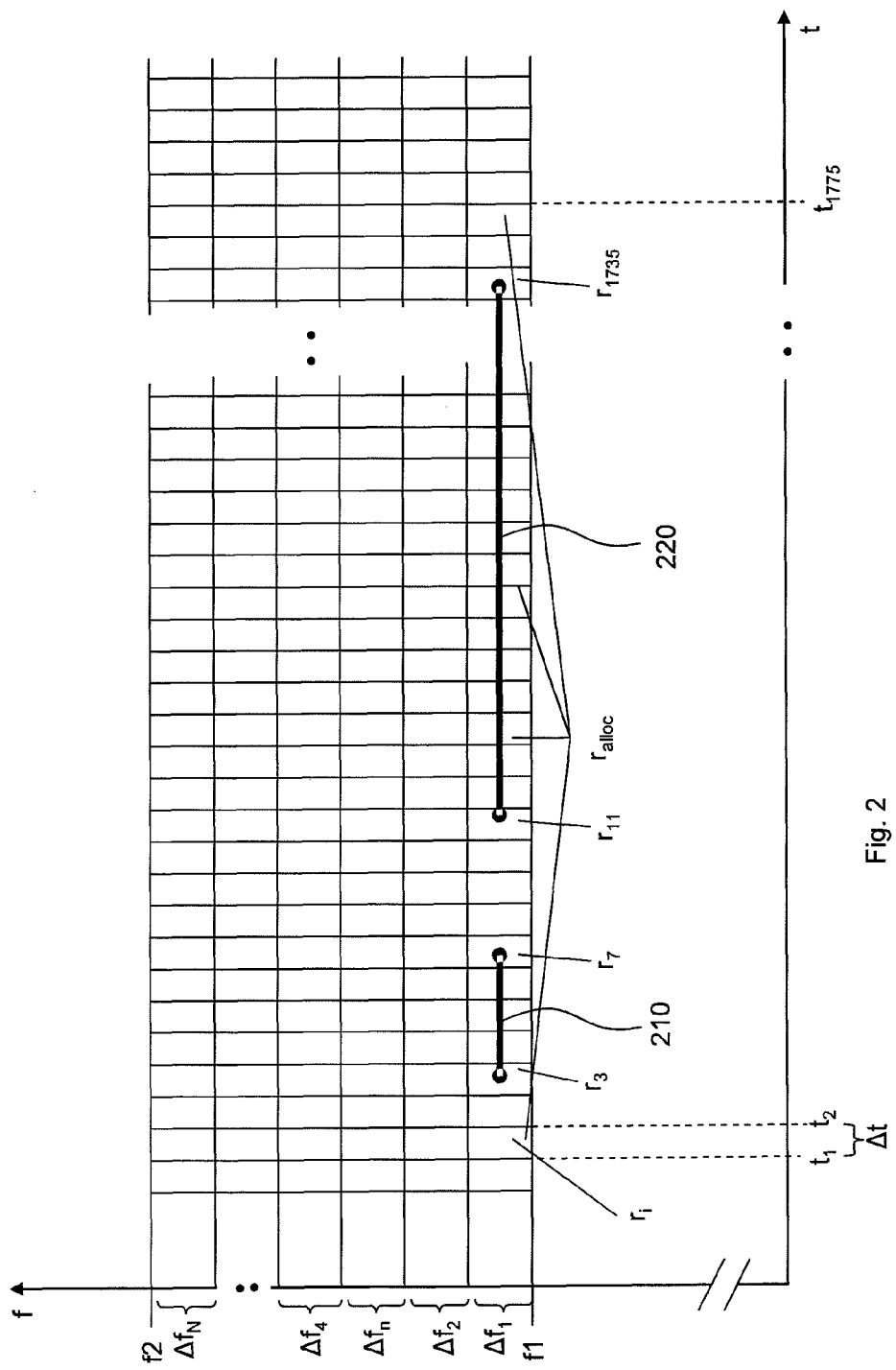
FIG. 2 depicts a schematic for dividing available physical communication resources into physical resource blocks.

The diagram of FIG. 2 depicts the use of frequency over time, wherein the horizontal axis, i.e. the x-axis, represents time t and the vertical axis, i.e. the y-axis, represents frequency f. In this embodiment a frequency range $f_1$ to $f_2$, i.e. a frequency band of bandwidth $f_2$-$f_1$ is assigned to a service provider. Frequency ranges below $f_1$ or above $f_2$ may be assigned to other service providers or may be used for any other arbitrary use. In one embodiment it is assumed that the service provider typically will use the frequency range for operating a mobile communication system.

In one embodiment the mobile communication system implements an orthogonal frequency division multiplexing (OFDM) method as access scheme. Accordingly, frequency range $f_1$-$f_2$ is divided into a plurality of N frequency sub-ranges $\Delta f_1 \ldots \Delta f_n \ldots \Delta f_N$, also known as sub-bands. OFDM systems per se are well known. The centre frequency of each sub-band is used as carrier frequency, also denoted in short as sub-carrier. Each sub-carrier is modulated with a conventional modulation scheme, wherein the symbol rate does not exceed the bandwidth of the sub-band. The sub-carriers accordingly do not overlap in frequency, thus being orthogonal. At the transmitting end an arbitrary data stream to be transmitted via an OFDM system accordingly may be de-multiplexed into a plurality of parallel data streams, wherein each of the parallel data streams is carried by one sub-carrier. At the receiver side the plurality of received sub-carriers is then de-modulated and multiplexed to form a single output data stream, which ideally reflects the input data stream. Alternatively, the sub-carriers may be used to transmit a plurality of independent data streams, for example of different users, wherein furthermore each sub-carrier may be shared in time by a plurality of users to transmit their data. Accordingly a time division multiplexing method using a single sub-carrier may be implemented thus enabling the plurality of users to exchange data using that single sub-carrier.

The OFDM system may implement a first communication protocol for communicating with mobile stations 130, wherein said first communication protocol may be designed to satisfy the high requirements for quality of service as required by the type of provided communication. For example the transmission of a short text message from a mobile device typically involves the transmission of a very small amount of data and wherein the transmission may be delayed and slow, since the recipient typically may tolerate a delay of a few moments, i.e. one second or more. The requirements for the transmission of speech data, i.e. in a plain telephone connection, the delay time may not exceed some tenths of a second otherwise the delays have significant impact on the quality of the connection thus becoming annoying for the users. However the amount of data transmitted in a plain speech connection is still comparatively small when compared to a connection for transmitting both sound and pictures, for example in a video phone call or when viewing a movie online. The communication protocol for communicating with mobile devices in modern mobile communication systems must be capable to provide huge amounts of data at high speeds and reliable connections. Accordingly, the modern mobile communication system will make use of a complex communication protocol for flexibly providing the required data rates and the required delays.

To enable a flexible allocation of transmission capacity to mobile stations 130 and autonomous terminals 140 the available radio resources are divided at least partially into small radio resource units. A sub-carrier of the OFDM system is divided into a plurality of equidistant time intervals $\Delta t = t_2 - t_1 = t_3 - t_2 \ldots$, typically named slots. In this way available physical radio resources, i.e. time and frequency, are divided into a plurality of radio resource units, wherein a radio resource unit $r_i$ comprises at least one time interval $\Delta t_n$ of one sub-carrier $\Delta f_n$ or in other words one slot of one sub-carrier. As is known from conventional mobile communication systems, for example the GSM or GPRS system, the radio resource units can be flexibly assigned to mobile stations 130 as single units or as a block comprising more than one radio resource units, wherein the block may comprise a plurality of contiguous time intervals of one sub-carrier or a plurality of contiguous time intervals of at least two adjacent sub-carriers. Typically the server side of a mobile communication system allocates radio resource units to a mobile station for use.

In order to transmit data to and receive data from an autonomous terminal 140 the available physical resources as described above are partially used for communicating, i.e. for exchanging data, with an autonomous terminal, wherein the communication protocol used for communicating with the autonomous terminal 140 differs from the protocol deployed by the mobile communication system for communicating with mobile stations 130.

In one embodiment the communication system allocates at least one radio resource unit, i.e. at least one time interval, i.e. one slot $\Delta t_n$, of one sub-carrier $\Delta f_n$, for communicating with an autonomous terminal. During that time slot $\Delta t_n$ and within the frequency range $\Delta f_n$ a base station of the communication system communicates with at least one autonomous terminal 140 using the communication protocol required by the autonomous terminal, wherein the communication protocol required by the autonomous terminal deviates significantly from the communication protocol used for communicating with mobile stations. Typically the protocol used for communicating with a autonomous terminal is less sophisticated and incompatible to that used for communicating with a mobile station.

Note that the term communication protocol specifies a set of rules specifying communication characteristics such as data representation, signalling, authentication and error detection.

In one particular embodiment the mobile communication system can be a GSM system, i.e. the system is compatible with the standards of the Global System for Mobile Communications. For implementing the specified OFDM scheme, an available frequency band is divided into a plurality of frequency sub-bands, each having a bandwidth of $\Delta f_n = 200$ kHz for example. Each sub-band is furthermore divided into time intervals named slots, a group of 8 slots is called a frame. When a mobile station communicates, one slot in each of a series of consecutive frames of one sub-band is allotted to this mobile station for each direction. Accordingly, a communicating mobile station is allotted one slot in a series of consecutive frames of a sub-band dedicated for uplink data transfer and one slot in a series of consecutive frames of a sub-band dedicated for downlink data transfer, for as long as the communication session lasts.

In this way the mobile communication system implements a hybrid of a frequency division multiple access (FDMA) scheme and time division multiple access (TDMA) scheme for communicating with a mobile station.

The centre frequency of each sub-band is used as carrier frequency, which may be modulated using GMSK, i.e. Gaussian Minimum Shift Keying, or 8-PSK, i.e. 8 Phase Shift Keying, as defined in the EDGE standard.

For communicating with an autonomous terminal, the mobile communication system at least allocates one slot in one sub-band. In this embodiment the mobile communication system may allocate a plurality of consecutive slots $r_{alloc}$ of one sub-band $\Delta f_1$, for example a series of 1733 consecutive slots each of duration 0.577 ms as defined for GSM, thus allocating the sub-band for one second. Accordingly, i.e. since the system may configure its available resources freely, the allocated sub-band during said second will not be used by any mobile station 130. Note that basically the slots may be allocated in any sub-band. In one particular embodiment the allocated consecutive slots may be allocated in the sub-band exhibiting the highest or the lowest sub-carrier frequency, so interferences caused by using these slots may affect only the lowest but one or the highest but one sub-band of the mobile communication system.

Note that in the described embodiment the sub-band either may be dedicated for uplink data transfer, i.e. from a mobile station to a base station, or for downlink data transfer, i.e. from a base station to a mobile station.

The mobile communication system may then use said allocated sub-band $\Delta f_1$ during slots 3 to 1735, i.e. the system may use resources $r_3$ to $r_{1735}$, for communicating with one or more than one autonomous terminal using a second communication protocol. Said second communication protocol may be simpler and less sophisticated than the first communication protocol, thus allowing to use simpler and less costly hard- and software equipment within the autonomous terminal for communication. Since any transmission in that sub-band should leave the communication in all other sub-bands as unaffected as possible, the modulation rate should not exceed the bandwidth of the sub-band.

In one embodiment data generated by the autonomous terminal is requested from the autonomous terminal, i.e. the radio communication system polls the data and thus initiates the communication with the autonomous terminal. Accordingly a corresponding request message may be sent downlink to the autonomous terminal at the beginning of the allocated sequence of contiguous slots.

The transmission of the request message from a base station 120 to an autonomous terminal 140 may start at the beginning of the allocated time interval, i.e. at the beginning of the second allocated for the communication. The transmission of the request message may be asynchronous to the communication of the residual mobile communication system. Accordingly, the base station may transmit the first symbol somewhere within an allocated resource unit, but not necessarily at the exact beginning of a radio resource unit. As illustrated in FIG. 2, the transmission of message 210 starts somewhere in the middle of the first allocated resource unit $r_3$ and lasts around 4 time intervals, thus ending somewhere in resource unit $r_7$.

The modulation method used may be a simple digital modulation, for example any non-coherent modulation method such as frequency shift keying (FSK), which in one particular embodiment may be a so-called minimum shift keying method or a Gaussian minimum shift keying modulation. Base station 120 may accordingly modulate the sub-carrier of the allocated sub-band using a modulation rate, i.e. a symbol rate, which does not exceed the bandwidth of the mobile communication system. In this way the base station modulates the request message onto the allocated sub-carrier.

The request message is then received by the autonomous terminal, wherein it is assumed that the autonomous terminal is capable of receiving and processing the request message. Responsive to the request message sent downlink to the autonomous terminal 140, it may generate and transmit a response message uplink within the allocated sequence of slots. That is, autonomous terminal 140 generates the response message and modulates the sub-carrier of the allocated sub-band to transmit the response message uplink to the base station. In one embodiment the autonomous terminal may use the same modulation method and symbol rate as used by the base station for transmitting the request message downlink. In alternative embodiments terminal 140 may use any modulation method and symbol rate to transmit the requested data uplink. In one embodiment an autonomous terminal may use the modulation method as used by the base station in the downlink transmission, but with a lower symbol rate, which simplifies the generation of the uplink signal and allows using even simpler processing stages in the transmission path of terminal 140.

The transmission of the response message 220 may start at any time within an allocated resource unit $r_{11}$ and lasts until resource unit $r_{1735}$. The response message in this way is sent uplink, i.e. from autonomous terminal 140 to the base station, using the same sub-carrier as used for the downlink transmission of the request message.

In this way the sub-band, in which the slots have been allocated, is used for asynchronously transmitting messages downlink and uplink, thus implementing a half-duplex method operated within the sub-band and within the allocated slots.

In an alternative embodiment at least one radio resource unit may be allocated for communicating according to a predefined time schedule. It is assumed that the predefined time schedule is known at the side of the autonomous terminal. Accordingly, the autonomous terminal may prepare in time for communicating, i.e. the autonomous terminal may prepare to and then actually transmit its data to the base station using the allocated radio resource units and according to the time schedule and without receiving a request message. The base station accordingly may prepare for receiving said message according to the time schedule. Considering that the requirements for a communication between a base station and an autonomous terminal are comparatively low, particularly there is no need for complying with an exact timing as necessary for synchronous transmission, the autonomous terminal may be equipped with and make use of comparatively simple and less costly hard- and software. Hence, this method allows transmitting the data collected by the autonomous device via an existing mobile communication system, wherein the terminal may use simple and less costly hard- and software as a mobile station.

In still another embodiment the mobile communication system can be a system complying with the 3GPP Long Term Evolution (LTE) fourth generation mobile broadband standard, which implements an OFDM system in its downlink path, i.e. from a base station to a receiving mobile station.

Figure 3:
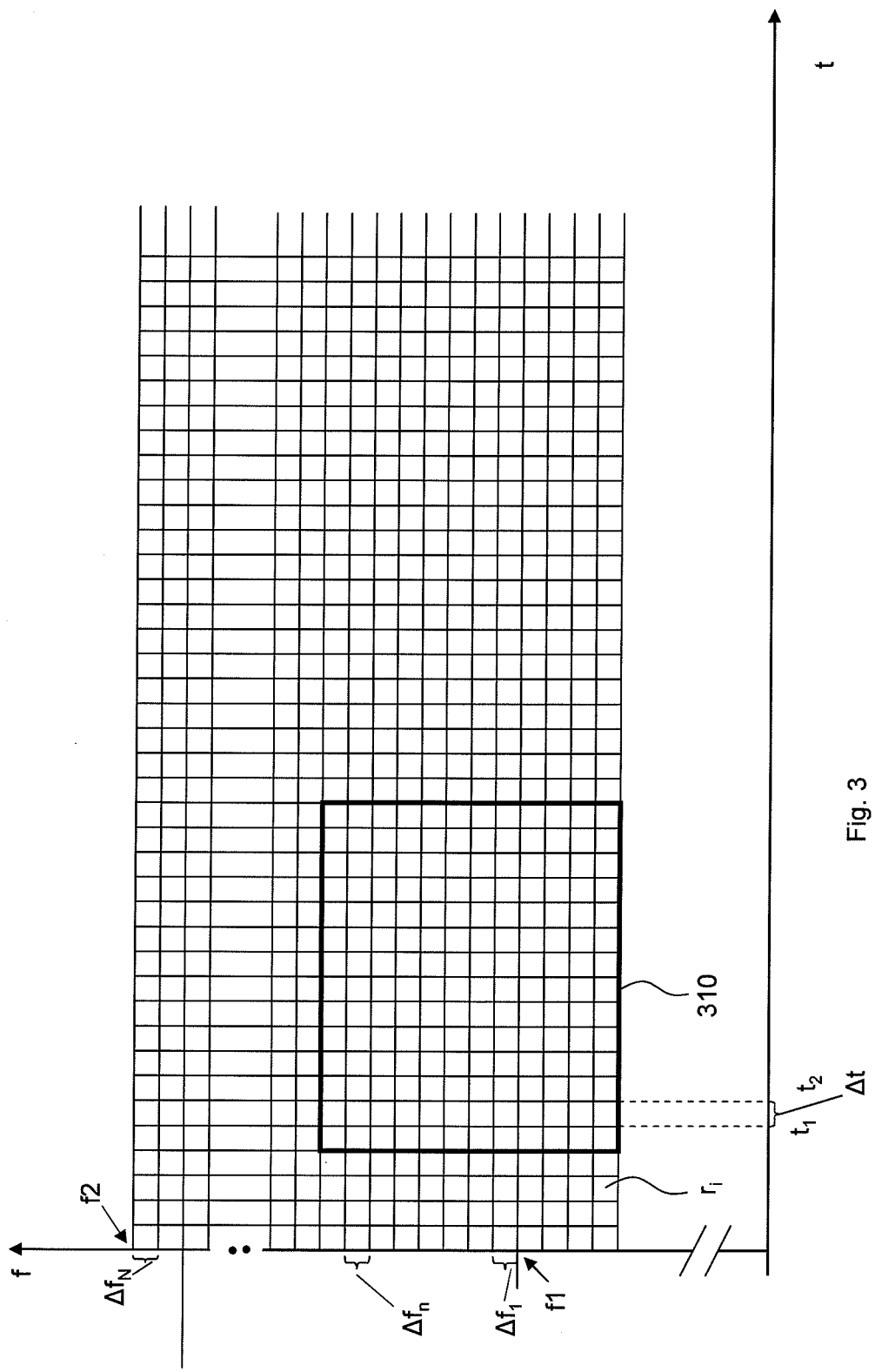
FIG. 3 depicts a schematic of radio resource management in an LTE system.

FIG. 3 depicts a frequency range $f_1$ to $f_2$, which is dedicated for downlink transmission to mobile stations in an LTE system. As specified for LTE, the available frequency range is divided into a plurality of sub-bands, each may have a bandwidth of 15 kHz. A time interval of 0.5 ms, i.e. a slot, forms one radio resource unit, i.e. in LTE terms a radio resource element. Two slots form a sub-frame and 20 slots form a frame, the frame thus having a length of 10 ms. Typically seven or, in case of long cyclic prefixes, only six symbols are transmitted in one slot.

In LTE a so-called resource block 310 can be formed by a block of twelve consecutive sub-bands in frequency and 14 symbols consecutive in time, thus having duration of 1 ms. Typically a resource block may be allotted for downlink transmission to one mobile station, wherein the mobile station is compatible with the LTE standard as defined.

In one embodiment, in an LTE system a plurality of consecutive resource blocks may be allocated for communicating with an autonomous terminal 140. In one particular embodiment a first plurality of 1000 consecutive resource blocks and a second plurality of another 1000 resource blocks parallel in the frequency domain are allocated for communicating with an autonomous terminal 140.

Accordingly, a resulting frequency bandwidth of 2×12×15 kHz=360 kHz can be used during one second to transmit information downlink, i.e. from a base station to an autonomous terminal 140, or uplink from an autonomous terminal to a base station, wherein the used communication protocol may be simpler than defined in the LTE standard, thus allowing to employ less sophisticated and costly hard- and software in the terminal.

Basically the allocated bandwidth can be used for communicating with an autonomous terminal according to any arbitrary protocol. Preferably said protocol is as simple as possible, thus allowing the usage of comparatively simple and cheap hard- and software in terminal 140.

In one embodiment the protocol used for up- and downlink transmission between a base station 120, i.e. in terms of LTE a so-called eNodeB, and an autonomous terminal 140 is a single carrier method using a simple digital modulation method. In this embodiment the centre frequency of the allocated bandwidth of 360 kHz is modulated using for example binary phase shift keying (BPSK), wherein the symbol rate is 360 kBaud.

Similar as described above the base station may initiate the communication with an autonomous terminal by sending an appropriate request message. Said request message may be transmitted according to a predefined time schedule, which is known both at the base station and at the autonomous terminal as well. An autonomous terminal accordingly may prepare to receive a request message from a base station, the request message thus initiating the exchange of messages and indicating the exact beginning of the communication. Autonomous terminal 140 may receive and process the request message and may send a response message corresponding to the request message. As described for the embodiment above, any message sent downlink or uplink may be sent asynchronous to the residual communication in the mobile communication system. Any uplink or downlink transmission accordingly may start at any time within the allocated time interval.

In one embodiment a base station and/or an autonomous terminal 140 may use a single carrier transmission protocol, wherein the centre frequency of the allocated bandwidth is used as carrier frequency, i.e. the centre frequency of the 2×12×15 kHz=360 kHz bandwidth. The modulation method may be any of the above described modulation methods at a symbol rate corresponding to or lower than the allocated bandwidth, i.e. 360 kBaud in this embodiment. In this way a bandwidth corresponding to a plurality of parallel radio resource blocks is used either uplink or downlink or both for a communication between a base station and an autonomous terminal, wherein a single carrier communication protocol is used.

For downlink transmission the system may optionally use a space coding scheme. That is for transmitting information from a base station to a terminal, the station may use its ability of transmitting the information via at least two antennas, if applicable, thus exploiting the transmit diversity of a plurality of transmit antennas while at the same time preserving a minimum of decoding complexity at a receiving terminal. In one particular example a space-time block coding (STBC) scheme may be applied, wherein the scheme may be orthogonal or non-orthogonal. In one particular embodiment an Alamouti space-time block coding scheme may be applied, which provides orthogonality between the signal vectors transmitted over the plurality of antennas while at the same time preserving low complexity for decoding at the receiver side, i.e. at the terminal.

For uplink transmission, i.e. for transmitting from a terminal to a base station, the terminal may optionally use a frequency hopping scheme to avoid or at least to mitigate interference of a particular carrier frequency and/or to avoid or at least to mitigate the effects of narrow subcarrier allocations. Basically a transmitting terminal may use any arbitrary hopping pattern as long as the receiving base station follows the hopping pattern. The hopping pattern may be a slow-frequency hopping (SFH), i.e. the transmitting terminal transmits at least one modulation symbols per frequency before hopping to the next frequency. Alternatively the hopping pattern may be a fast-frequency hopping (FFH) pattern, i.e. while transmitting one modulation symbol the terminal hops to at least one other carrier frequency.

When using a frequency hopping scheme for uplink transmission the base station in one embodiment may allocate in a first sub-band at least one resource unit for uplink transmission of a first portion of data and then allocate in a second sub-band at least one resource unit for transmitting a second portion of data and then subsequently allocate resource units in at least two different sub-bands for continuing the transmission, wherein the radio resource units are contiguous in time, but not necessarily adjacent in frequency. In this way the base station allocates resource units in one sub-band at a time while enabling a frequency hopping pattern for uplink transmission. In an alternative embodiment the base station may allocate resource units in more than one sub-band at a time, for example when allocating a radio resource block in a system complying with the LTE standard. The terminal may transmit a first portion of data using a first sub-band and then use another sub-band of the plurality of sub-bands comprised in the resource block for transmitting a second portion of data. In this way a plurality of sub-bands is allocated for uplink transmission, wherein the terminal uses one sub-band of the plurality of allocated sub-bands of a radio resource block. The base station may allocate more than one time contiguous radio resource blocks comprising the same set of sub-bands. However, in order to spread an uplink transmission across more sub-bands as comprised in one radio resource block, the base station may allocate time contiguous radio resource blocks comprising different sets of sub-bands.

Note that the usage of the space coding scheme for downlink transmission is independent from the usage of the described frequency hopping scheme. Accordingly, the method may make use of either a space coding scheme or a frequency hopping scheme or both.

Since the communication protocol used for the communication between the mobile communication system and an autonomous terminal 140 typically is less sophisticated and can be deployed using hardware already existing in the base stations, the implementation of the communication with an autonomous terminal only requires a modification of the software in the mobile communication system. Hence, the financial efforts required for communication with an autonomous terminal are low.

Furthermore, a plurality of autonomous terminals 140 optionally can be grouped based on a common property regarding the requirements of the terminals on the physical and protocol access, and said grouping can be taken into account when allocating resources for communication with terminals of that group. In one embodiment terminals can be grouped based on the frequency of spectrum access for communication.

The terminals belonging to one group may be furthermore adapted and configured to manage allocated radio resources within that group independently for uplink transmission. The terminals accordingly may be adapted and configured to communicate with each other. Basically the terminals may use any arbitrary wired or wireless, i.e. radio, communication method, wherein radio communication is preferred since that saves the effort of providing a cable connection. In one embodiment the terminals may use the radio communication protocol that is used when communicating with a base station. In alternative embodiments the terminals may use any conventional protocol, for example protocols according to the 802.11 family or according to the BlueTooth protocol.

The described method discloses a flexible radio resource management method for allocating radio resources for communicating between base stations and mobile stations and terminals using more at least two communication protocols at the same time. In particular highly sophisticated radio communication protocols as specified for highly available, reliable and communication can be used at the same time as simpler and less sophisticated protocols, which accordingly require less costly soft- and hardware equipment in the terminals.

For implementing the described method in most cases only the software in the base stations has to be adapted to provide for the new functionality. Accordingly it takes only small efforts to implement the described method in an existing mobile communication system.

Figure 4:
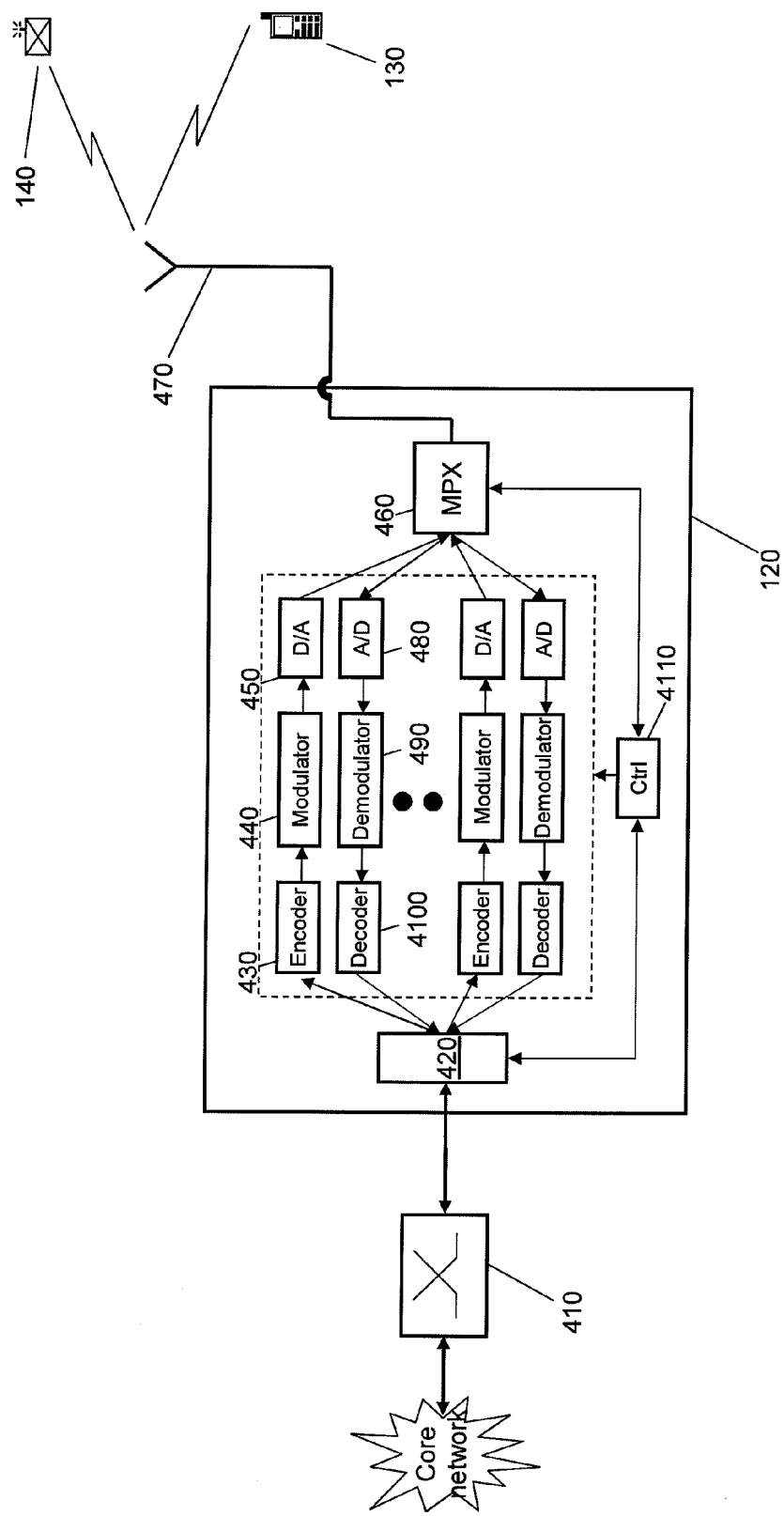
FIG. 4 depicts a schematic of a base station.

FIG. 4 depicts a schematic of a radio access point, which in this context shall denote the device managing and providing a radio link between the wired core network of a mobile communication system and a mobile station 130 and/or a terminal 140 respectively. A radio access point in one embodiment may be a base station 120, i.e. for example a so-called base-transceiver-station (BTS) in a system according to the GSM standard or a so-called node-B in a system complying with UMTS.

Radio access point 120 at its one side is wired to a next station 410, which may be a base station controller (BSC) in GSM or a radio network controller in a UMTS system. Said next station 410 either belongs to the core network of the communication system or couples the radio access point to that core network.

For receiving the data and corresponding control information from station 410, radio access point 120 comprises an interface block 420. Furthermore radio access point 120 comprises processing paths for processing data according to the first communication protocol and the second communication protocol and a control means 4110, which controls the operation of the blocks in the radio access point. Note that control means 4110 may be coupled to each operational block in radio access point 120 as indicated by the dashed square.

In one embodiment a processing path may be a downlink processing path for processing data to be transmitted downlink, i.e. from the radio access point to a mobile station 130 or a terminal 140 respectively. A downlink processing path may comprise an encoder 430 for encoding data, a modulator 440 and a digital-to-analogue converter 450. The output of converter 450 is fed to a multiplexer/demultiplexer 460, which combines the outputs of all downlink paths to one analogue output signal. Multiplexer/demultiplexer 460 passes that output signal to antenna 470. In addition to these basic processing blocks a downlink processing path may comprise a plurality of further processing blocks, for example filters for band path filtering or power amplifiers for amplifying the output of a digital to analogue converter.

Control information received from station 410 via interface 420 is passed to control means 4110. Control means 4110 is coupled to said interface 420 and to the processing blocks comprised in the radio access point for controlling the operation of the blocks according to the received control information. Means 4110 accordingly controls the processing of data to be transmitted downlink to a mobile station 130 or a terminal 140 and also controls the processing of uplink data as received from a mobile station 130 or a terminal 140.

Radio access point 120 comprises at least a first downlink processing path for processing data according to first communication protocol and a second downlink processing path for processing data according to the second communication protocol, the first and second communication protocols as described above. In this way radio access point 120 receives data and control information from the station 410 and is adapted and configured for processing the data and control information to transmit the data to at least one mobile station 130 and/or at least one terminal 140 respectively according to the first or second communication protocol respectively.

For receiving, processing and outputting radio signals transmitted uplink, i.e. from a mobile station 130 or a terminal 140 to radio access point 120, the radio access point comprises uplink processing paths. In one embodiment radio access point may comprise at least one uplink processing path for processing signals according to the first communication protocol and at least one processing path for processing signals according to the second communication protocol. Radio signals received by antenna 470 may be split up and passed to the different processing paths accordingly by multiplexer/demultiplexer 460.

An uplink processing path in one embodiment essentially may comprise processing blocks for reverse processing as in the downlink processing path, i.e. an analogue-to-digital (ADC) converter 480, a demodulator 490 and a decoder 4100. The output of decoder 4100 is passed to interface 420, which in turn passes the decoded data to station 410 for further processing.

In this way radio access point 120 receives data and control information from the station 410 and is adapted and configured for processing the data and control information to transmit the data to at least one mobile station 130 and/or at least one terminal 140 respectively and for receiving data from a mobile station and/or at least one terminal 140 respectively according to the first and second communication protocol.

Note that the processing blocks as depicted in FIG. 4 may be implemented by software executed by a digital signal processor. Functional blocks and processing paths in either direction accordingly may be implemented any arbitrary hard- and software capable of providing the described functionality.

The invention claimed is:

1. A radio communication method for communicating between locally fixed base stations and mobile stations, wherein the base stations and the mobile stations communicate according to a first communication protocol, comprising the steps of:
   (a) dividing an available radio resource into a plurality of radio resource units, and
   (b) using radio resource units for communication between the base stations and the mobile stations, and
   (c) at the same time using at least one radio resource unit for communication between the base station and a terminal according to a second communication protocol, wherein the second communication protocol is a single carrier protocol and incompatible with the first communication protocol, and
   wherein communications using the second communication protocol are asynchronous to communications using the first communication protocol.

2. The radio communication method of claim 1, wherein the first communication protocol comprises an orthogonal frequency division multiplexing (OFDM) method and the radio resource unit is a time interval of one OFDM sub-band.

3. The radio communication method of claim 2, wherein at least one base station communicates uplink and downlink with the terminal within the radio resource unit.

4. The radio communication method of claim 3, wherein the base station communicates uplink and downlink with the terminal within a plurality of time contiguous radio resource units of one sub-band.

5. The radio communication method of claim 1, wherein a plurality of time contiguous radio resource units of at least two adjacent sub-bands is used for uplink or downlink communication with the terminal.

6. The radio communication method of claim 1, wherein the communication between the base station and the terminal is asynchronous to the communication between the base station and the mobile stations.

7. The radio communication method of claim 1, wherein at least one radio resource unit of a first sub-band and at least one radio resource unit of a second sub-band, the radio resource units being contiguous in time, is allocated and used for uplink transmission from a terminal.

8. The radio communication method of claim 1, using a space coding scheme for downlink transmission.

9. The radio communication method of claim 1, wherein radio resources are allocated according to a predefined time schedule.

10. The radio communication system comprising at least one base station and one mobile station and one terminal, wherein the system is adapted and configured for performing a radio communication method according to claim 1.

11. A radio access point, wherein said radio access point is adapted and configured to:
   communicate with at least one mobile station according to a first communication protocol,
   wherein an available radio resource unit is divided into a plurality of radio resource units, and
   wherein said radio resource units are used for communication with the at least one mobile station, said radio access point being further adapted and configured for
   using a least one radio resource unit for communication with at least one terminal at the same time and according to a second communication protocol, wherein said second communication protocol is a single carrier protocol and incompatible with the first communication protocol, and
   wherein communications using the second communication protocol are asynchronous to communications using the first communication protocol.

12. The radio access point of claim 11, comprising at least
   (a) processing paths for processing data to be transmitted to and received from a mobile station according to the first communication protocol and
   (b) processing paths for processing data to be transmitted to and received from a terminal according to the second communication protocol.

13. The radio access point of claim 12, further comprising control means for controlling the processing paths for processing data to be transmitted to and received from the mobile station and for controlling the processing paths for processing data to be transmitted to and received from the terminal.

* * * * *